United States Patent [19]

Boegel

[11] 4,246,939

[45] Jan. 27, 1981

[54] AUTOMATIC SCREW DRIVING APPARATUS

[75] Inventor: Gerhard Boegel, Heerbrugg, Switzerland

[73] Assignee: SFS Stadler AG, Heerbrugg, Switzerland

[21] Appl. No.: 972,395

[22] Filed: Dec. 22, 1978

[30] Foreign Application Priority Data

Dec. 27, 1977 [CH] Switzerland ........................ 16158/77

[51] Int. Cl.[3] ........................ B25B 23/00; B23P 19/06

[52] U.S. Cl. ........................................ 29/771; 29/240; 29/809; 29/813; 81/431

[58] Field of Search .......................... 10/155 R, 155 A; 29/771, 809, 813, 240; 81/57.23, 57.37; 144/32 R; 227/18, 120

[56] References Cited

U.S. PATENT DOCUMENTS

| | | | |
|---|---|---|---|
| 3,107,707 | 10/1963 | Berg | 144/32 |
| 3,279,045 | 10/1966 | Dixon | 144/32 X |
| 3,581,370 | 6/1971 | Passarella et al. | 144/32 X |
| 3,601,168 | 8/1971 | Fernstrom | 144/32 |
| 4,018,254 | 4/1977 | DeCaro | 144/32 R |
| 4,062,388 | 12/1977 | DeCaro | 144/32 R |
| 4,091,850 | 5/1978 | Kjolsrud | 144/32 R |

FOREIGN PATENT DOCUMENTS 1201335 8/1970 United Kingdom .................... 81/57.37

*Primary Examiner*—Ervin M. Combs

*Attorney, Agent, or Firm*—Toren, McGeady and Stanger

[57] ABSTRACT

Automatic driving apparatus which sequentially inserts screws provided with washers into work pieces includes a chute formed with an opening transverse to its axis. Screws are fed sequentially through the opening into the chute. A driver in the chute is shaped for driving engagement with an introduced screw. A drive mechanism axially moves the driver in the chute and rotates the same in a plane transverse to the axis for thereby engaging the driver with the screw and axially moving the screw with the rotating driver. A magazine adapted to hold apertured washers is provided with a slide which sequentially moves the washers transversely to the chute axis from the magazine to a position of alignment of an aperture in the moved washer with an axially moving screw in the chute. A source of motive power is connected with the feeding mechanism for the screws, the drive mechanism, and the slide for transmitting motive power to the feeding mechanism, the drive mechanism, and the slide in timed sequence.

12 Claims, 29 Drawing Figures

2
4
5
6
7
14
1
24
25
11
10
13
16
12
3
12
15

9
8

18
17

FIG.14
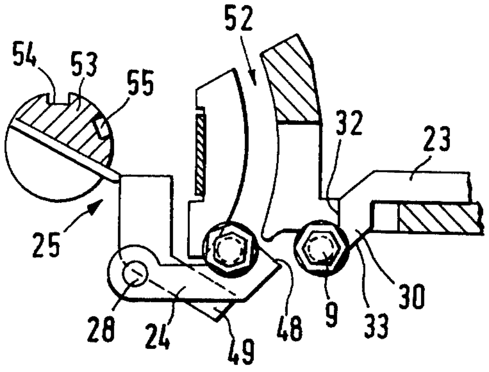
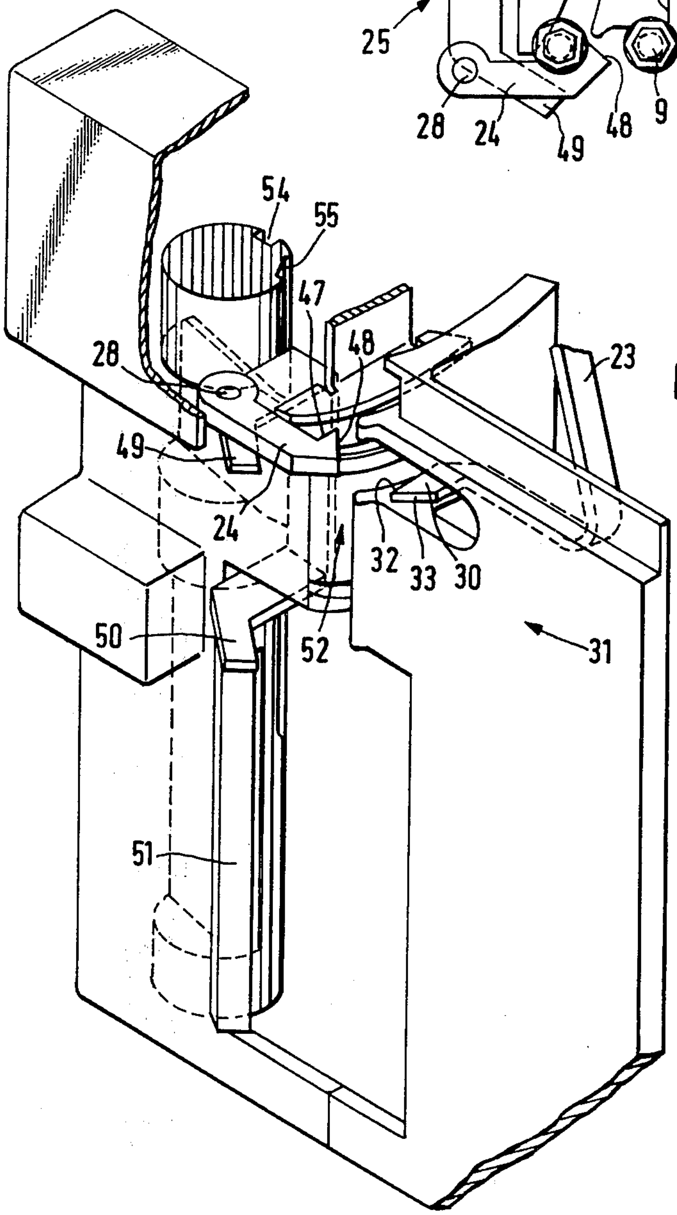
FIG.13

FIG.17
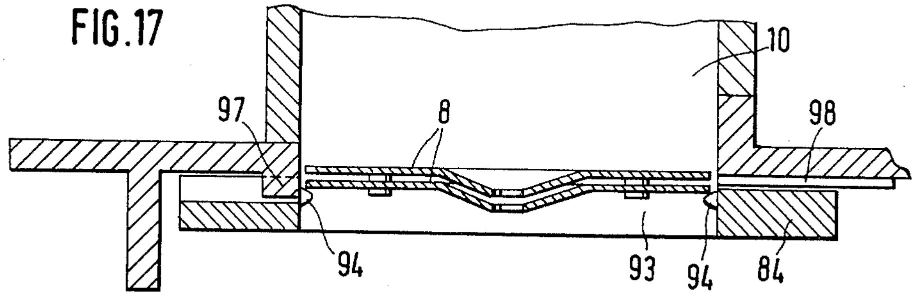
FIG.15
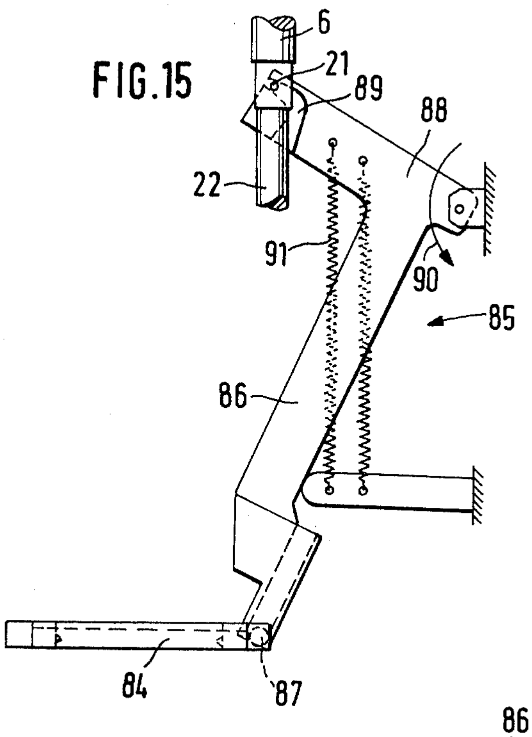
FIG.16
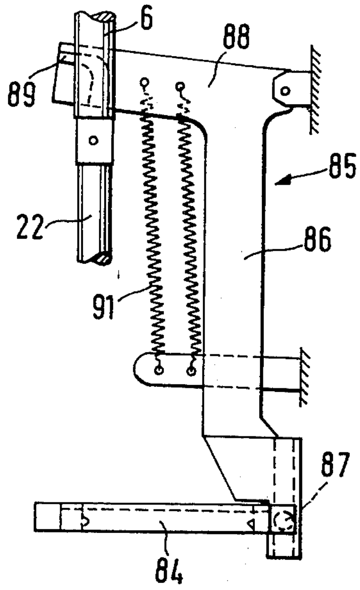
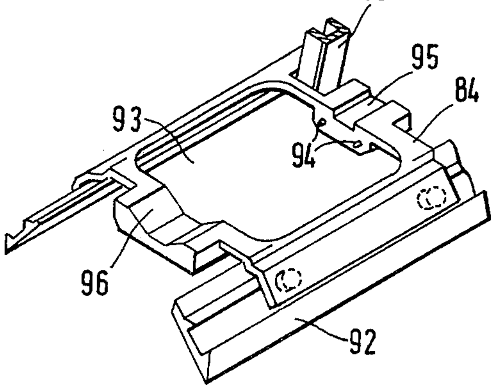
FIG.18

AUTOMATIC SCREW DRIVING APPARATUS

This invention relates to automatic screw driving apparatus, and particularly to apparatus which assembles each screw with a washer before driving the screw into a workpiece.

It is known from German published patent application No. 26 31 841 to attach panels of insulating material to corrugated sheet metal by means of screws carrying relatively large washers to distribute the fastening pressure over a sufficiently large surface area of the friable panels. The device employed provides feed channels for washers and screws respectively which drop into suitable alignment when manually introduced into the channels and are attached by means of a mechanism which presses the screw into the material to be fastened while simultaneously turning the screw. While operation of the briefly described device is more convenient than it would be to assemble each screw manually with an apertured washer and thereafter driving the screw into the material to be fastened, it still consumes relatively much time of an operator.

It is a primary object of this invention to provide screw driving apparatus suitable for assembling washers having a diameter of about three inches or more with sheet metal or wood screws and for driving the screws carrying the washers into a workpiece without requiring the operator to do more than place the apparatus on the workpiece and press it down.

With these and other objects in view, the invention provides screw driving apparatus in which an approximately tubular chute is formed with an opening transverse to its axis. A feeding mechanism sequentially feeds screws through the opening into the chute. A driver in the chute is shaped for driving engagement with a screw introduced by the feeding mechanism. A drive mechanism axially moves the driver in the chute and rotates the driver in a plane transverse to the chute axis so as to engage the driver with the screw and to rotate the driver together with the screw while axially moving the screw with the rotating driver.

A slide mechanism sequentially moves apertured washers from a magazine holding a stack of the same transversely to the chute axis to a position of alignment of the aperture in a moved washer with a screw axially moving in the chute. A motion transmitting train operatively connects a source of motive power to the feeding mechanism, the drive mechanism, and the slide mechanism for transmitting motive power to the several mechanisms in timed sequence.

Other features, additional objects, and many of the attendant advantages of this invention will readily be appreciated as the same becomes better understood by reference to the following detailed description of preferred embodiments when considered in connection with the appended drawing in which:

FIG. 12 shows the device of FIG. 11 in the operating condition illustrated in FIG. 8;

FIG. 13 shows the apparatus of FIG. 9 and associated elements in a perspective view, parly in section;

FIG. 14 illustrates elements of the device of FIG. 13 in partly sectional plan view;

FIGS. 15 and 16 illustrate elements of a washer feeding mechanism in the apparatus of FIG. 1 in side-elevational views in respective, different operating conditions;

FIG. 17 shows portions of a washer magazine in the apparatus of FIG. 1 in side-elevational section;

FIG. 18 is a perspective view of a slide in the washer feeding mechanism;

Figures 1, 2, 3:
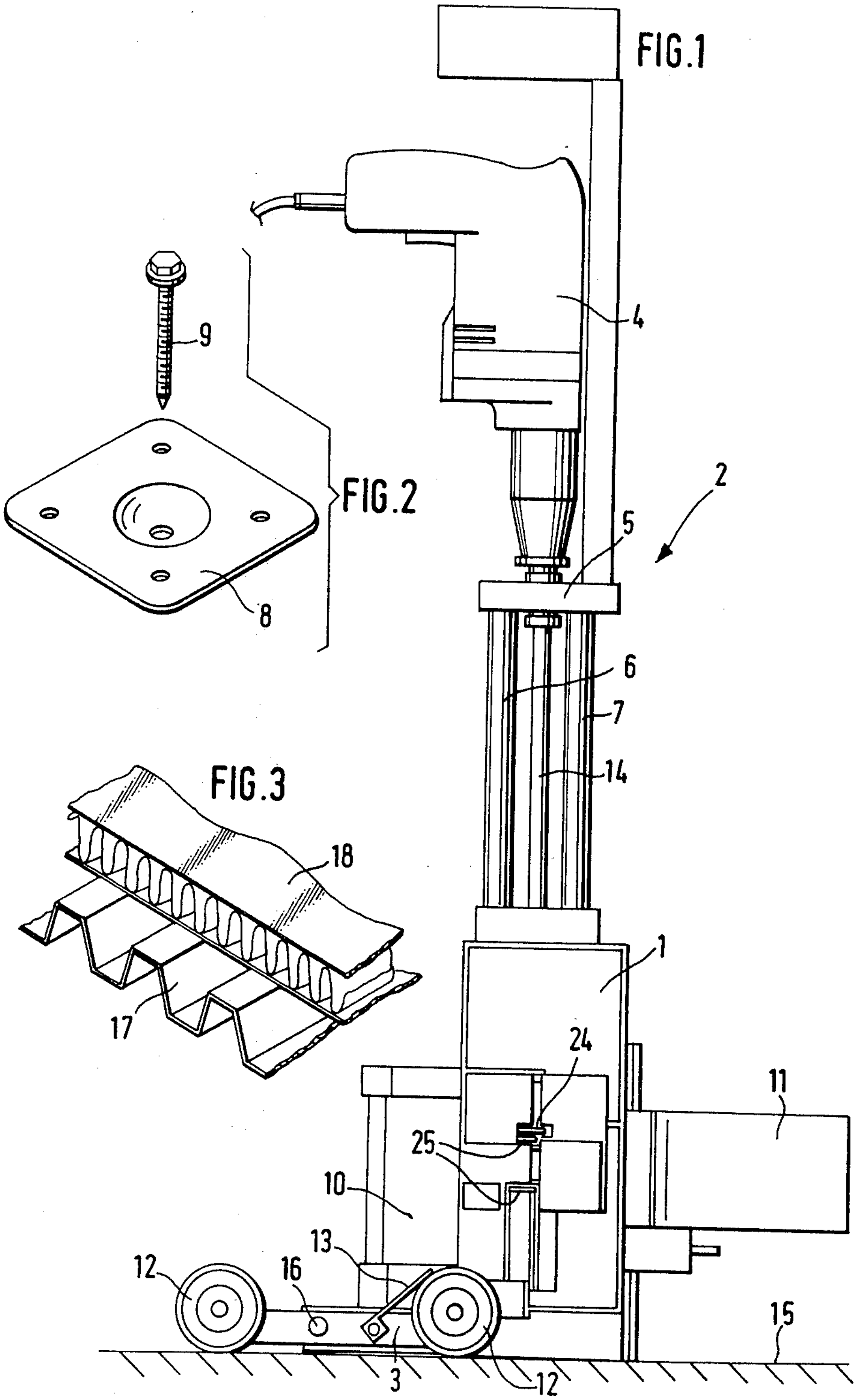
FIG. 1 shows apparatus of the invention in side elevation.
FIG. 2 shows a screw and washer to be attached by means of the apparatus of FIG. 1 in an exploded, perspective view.
FIG. 3 is a fragmentary perspective view of a roof which may be assembled by means of the screw and washer of FIG. 2.

Referring now to the drawing in detail, and initially to FIG. 1, there is shown an automatic screw-and-washer mounting apparatus of the invention whose principal operating elements are contained in a supporting casing 1 on top of which a frame 2 is mounted. The casing is supported on a carriage 3. Power for the apparatus is provided by a portable electric drill attached to the frame 2. A carrier bar 5 is axially secured but rotatable on the chuck of the drill 4, and two tubular control rods 6, 7 extend from the bar 5 into the casing 1.

A washer magazine 10 is attached to the rear wall of the casing 1 and a drum-shaped screw magazine 11 to the front wall. The carriage 3 travels on four wheels 12 and is braked in the illustrated position of the casing 1 by bars 13 mounted on a common shaft and frictionally engaging the tires of the two front wheels 12. When the apparatus is to be moved along a surface 15 on which the wheels 12 travel, the casing 1 is tilted rearwardly on the carriage 3 about a shaft 16, and this motion is transmitted to the brake bars 13 in a manner not shown to release the front wheels 12.

A tubular, internally threaded drive rod 14 mounted in the chuck of the drill 4 between the control rods 6, 7 extends into the casing 1 for turning a screw suitably positioned by a feeder 25 assisted by a pawl 24, as will presently be described in more detail.

The apparatus of the invention will be discussed by way of example in its application to the fastening of roofing panels on a wooden frame, but other uses will readily suggest themselves. The nails or screws 9 employed for this purpose and shown in FIG. 2 have hexagonal heads and coarse wood threads, and thus require a driver having a hexagonal receptacle, but the apparatus will be adapted to any other type of screw head in an obvious manner. Large washers 8 need to be placed under the screw heads to distribute the pressure of the head over a much larger area when the screw shank enters the wooden supporting structure. Washers of the illustrated square shape are used for protecting insulating panels 18 laid over corrugated metal roofing as shown in FIG. 3.

Figure 5:
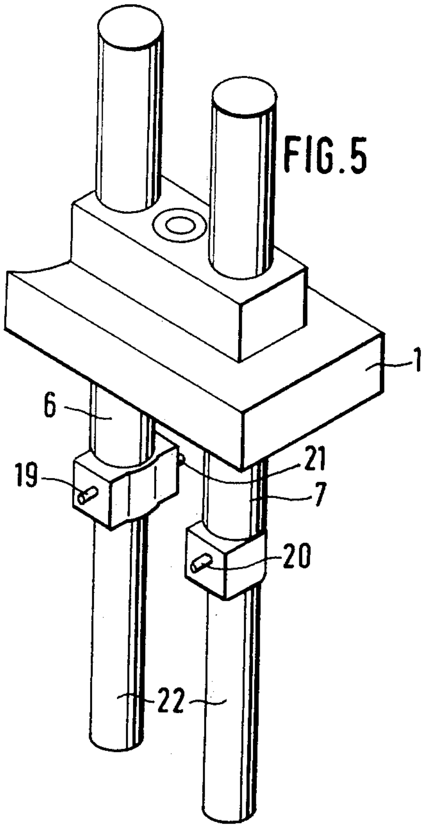
FIG. 5 is a fragmentary perspective view of a portion of the apparatus of FIG. 1.

As is best seen in FIG. 5, the two control rods 6, 7 are slidably received in the top of the casing 1 and are guided in the casing by telescoping engagement with fixed tubes 22. the lower end of the tube 6 carries two diametrically opposite, projecting drive pins 19, 21, and one drive pin 20 is mounted on the rod 7.

Figure 9:
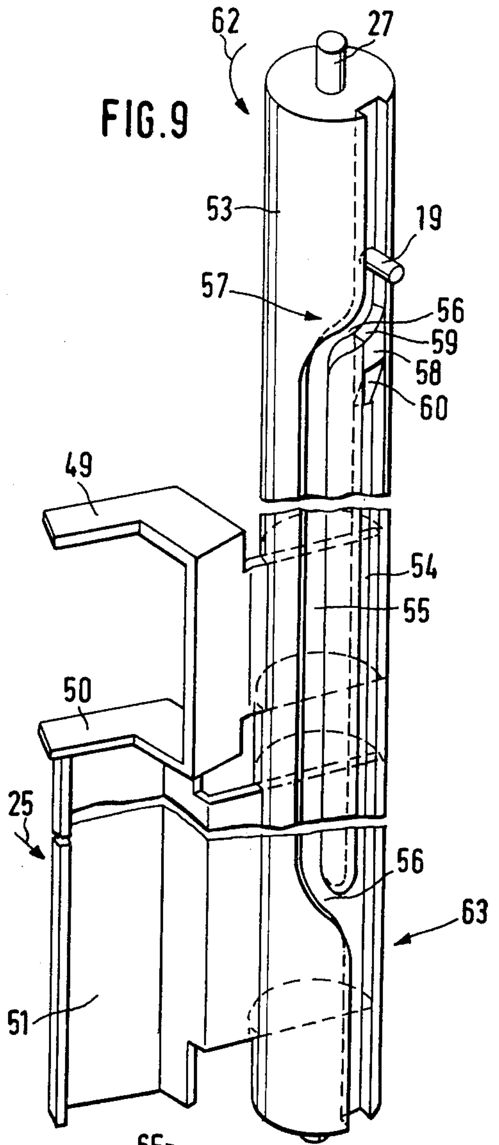
FIG. 9 shows a portion of the device of FIG. 4 in a fragmentary, perspective view on a larger scale.

The pin 19 operates the feeder 25 as is shown in FIG. 9. The feeder 25 consists of sheet metal and is fixedly mounted on a cylindrical bar 53 pivotally mounted in the top and bottom of the casing 1 by stub shafts 27. The feeder 25 has two vertically spaced arms 49, 50 which are approximately hook-shaped. An apron 51 depends from the lower arm 50. A straight groove 54 extends over the entire axial length of the bar 53. Another straight groove 55, is spaced parallel to the groove 54 and is shorter, and it is connected to the latter by oblique grooves 56. Where the grooves 54, 56 converge obliquely upward at 57 near the upper end of the bar 53, a baffle 58 blocks the groove 54 in a downward direction. The drive pin 19 moves in the grooves 54, 55 when the drill 4 together with the control rod 6 is lowered and raised.

Figure 10:
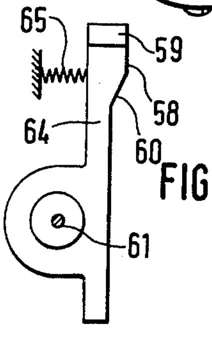
FIG. 10 is an elevational view of an element of the device of FIG. 9.

During downward movement of the pin 19 from the illustrated position in the top portion of the groove 54, the pin is deflected into the upper oblique groove 56 and thereafter into the groove 55 by a cam face 59 of the baffle 58 which is approximately radial relative to the axis of the bar 53, thereby turning the bar 53 together with the feeder 25 in the direction of the arrow 62. When the pin returns to the groove 54 through the lower oblique groove 56 at 63, the bar 53 and feeder 25 are returned to the illustrated position. As is shown in FIG. 10, the baffle 58 constitutes the end of one arm of a lever 64, recessed in the bottom of the groove 54 and fulcrumed on a pin 61 within the bar 53. A helical compression spring 65 biases the baffle toward the position shown in FIG. 9, but yields when the pin 19 traveling upward in the groove 54 passes over another cam face 60 of the baffle 58 which is obliquely inclined relative to a plane through the axis of rotation of the bar 53. The bar stands still during return of the drill 4 to its starting position.

Figure 4:
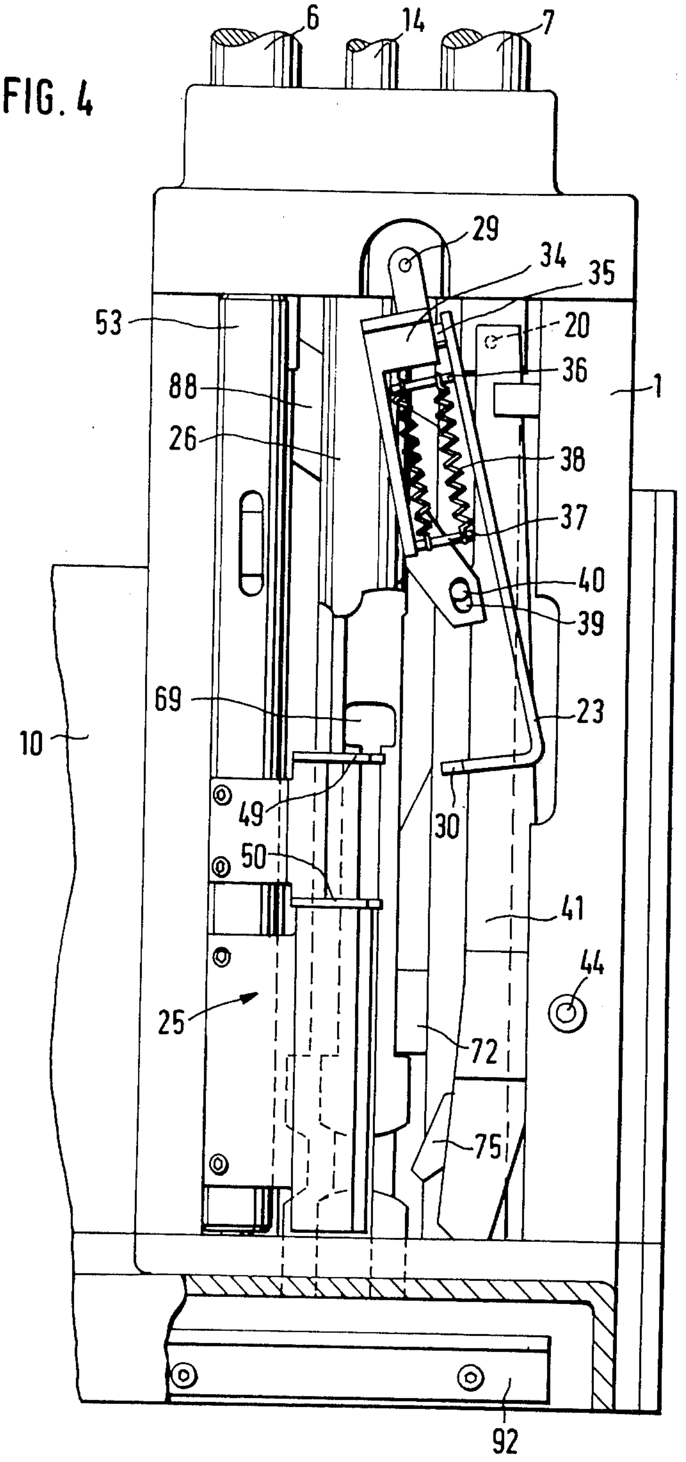
FIG. 4 illustrates operating elements of the apparatus of FIG. 1 in partly sectional side elevation on a larger scale.

Screws 9 are presented to the feeder 25 by a pusher 23, and are introduced by the feeder into a chute 26 coaxially receiving an extension of the drive rod 14 through an axially elongated, keyhole-shaped opening 69 of the chute 26 as is partly evident from FIG. 4. As is best understood by joint consideration of FIGS. 4, 11, and 12, the long arm of the L-shaped sheet metal pusher 23 is mounted on a carrier frame 34 pivoted on the top of the casing 1 by a horizontal pin 29. The upper end of the pusher 23 is pivotally attached to the frame 34 by a pin 35 and may thus swing at right angles to the plane of FIG. 4. two helical tension springs 38 connect respective rods 36, 37 parallel to the pivot pin 35 on the pusher 23 and the frame 34 respectively. The bars 36, 37 are offset relative to the axis of the pivot pin 35 in such a manner that the springs 38 bias the pusher 23 to swing out of the plane of FIG. 4 toward the viewer.

Figure 11:
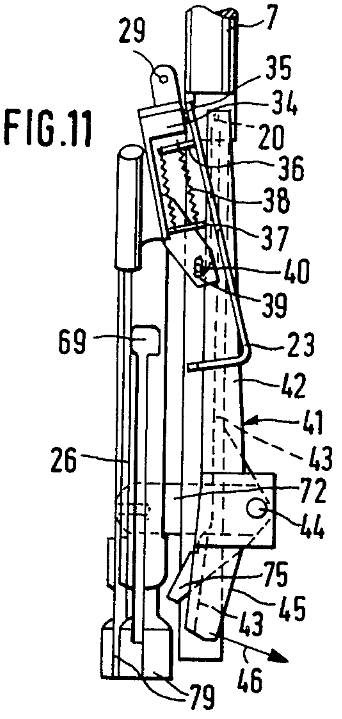
FIGS. 11 and 12 show the device of FIG. 6 and associated elements in side elevation in a position corresponding to that of FIG. 7.
Figure 12:
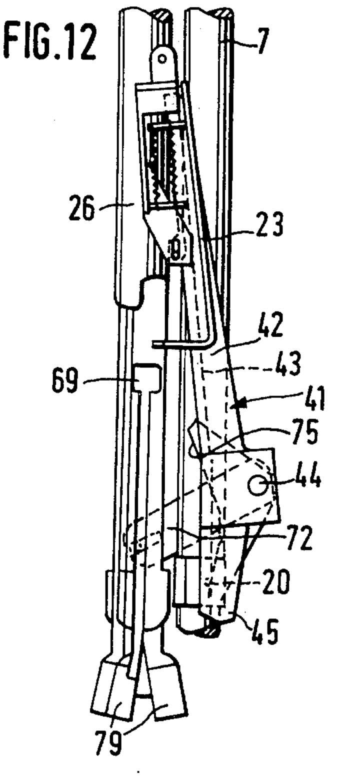

An elongated slot 39 near the free end of the frame 34 receives a pin 40 projecting from an upright operating lever 41. The drive pin 20 is shown in FIGS. 11 and 12 to be received in a longitudinal groove 43 of the lever 41 in all operative positions of the control rod 7. When the pin 20 moves in the portion of the groove 43 in the upper arm 42 of the lever, it holds the lever in the position of FIG. 11 in which the pin travels straight down, parallel to the rod 7, and the lever 41 is stationary on its pivot 44. The groove portion in the lower, shorter arm 45 is angularly offset from the upper portion so that the drive pin 20 swings the lever 41 in the direction of the arrow 46 (FIG. 11) into the position shown in FIG. 12, a movement which is transmitted to the pusher 23 by the pin 40.

The pawl 24 is best seen in FIGS. 13 and 14 which also show the cooperation of the pawl with the pusher 23 and the feeder 25. The free end 30 of the short arm of the pusher 23 is offset at right angles. It has a frontal edge face 32 at approximately right angles to the direction of pusher movement indicated by an arrow 31, and an opposite, oblique cam face 33. One end of the pawl 24 is mounted on the casing 1 by means of a vertical pivot pin 28 immediately above the path of movement of the feeder arm 49. Its hook-shaped free end has two obliquely converging front faces 48 and a rear face 47 transverse to the direction of the arrow 31. A non-illustrated helical tension spring biases the pawl 24 counterclockwise, as viewed in FIGS. 13 and 14.

The screws 9 are mounted on a non-illustrated carrier tape coated with pressure-sensitive adhesive, as is conventional in itself, and the tape is pulled stepwise from the magazine 11 by the pusher 23 engaging the shank of a leading screw 9 immediately below the head and pushing the screw within range of the feeder 25 as the pin 20 approaches the lower end of its stroke in the groove 43. The screws are initially attached to the tape in the spaced parallel relationship shown in FIG. 14, and the tape is separated from the screws in a manner analogous to that shown in FIG. 24 and conventional in itself.

The advancing screw 9 deflects the pawl 24 against its biasing spring and is prevented from moving backward with the pusher 23 during the return movement of the latter by the rear face 47 of the pawl. The screw is held by the pawl at the entrance to an arcuate guide channel 52 in the casing 1 which leads to the opening 69 of the chute 26. The two arms 49, 50 of the feeder 25 engage the screw 9 held by the pawl 24 and push it into the channel 52, the head of the screw resting on the arm 49 and the shank being engaging by the arm 50 and as much of the apron 51 as is needed by the length of the screw. Grooves in the walls of the channel 52 guide the arms 49, 50.

Figure 6:
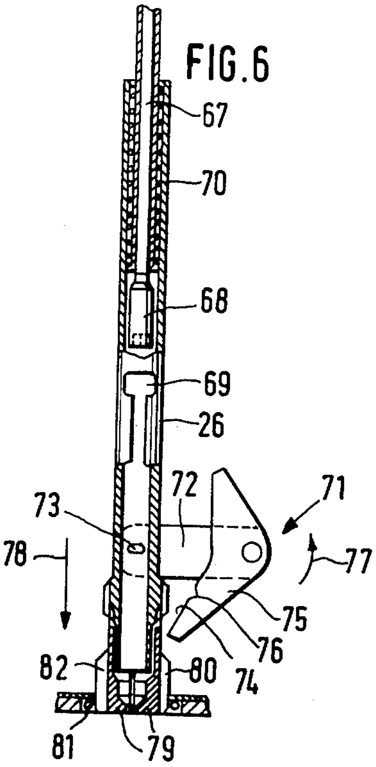
FIG. 6 shows a portion of the device of FIG. 4 in side-elevational section on a somewhat reduced scale.
Figure 7:
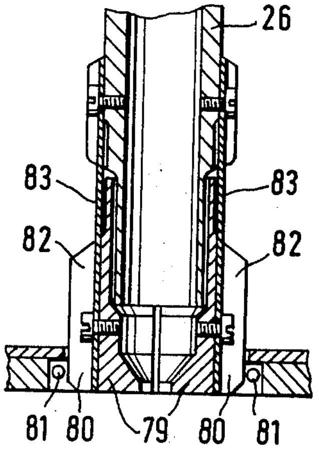
FIGS. 7 and 8 are side-elevational, sectional views of a part of the device of FIG. 6 on the approximate scale of FIG. 4 and in different respective operating conditions.
Figure 8:
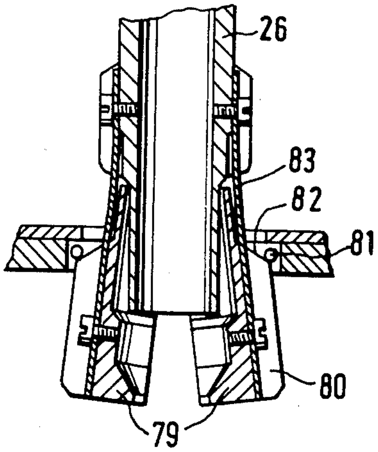

The chute 26, partly shown in FIGS. 4, 11, and 12, will now be described with reference to FIGS. 6 to 8. A threaded spindle 67 coaxially fastened to the drive rod 14 in the casing 1 carries a driver 68 whose axial position on the drive rod may be adjusted by threaded movement of the spindle in the drive rod and then fixed by a locking nut, not shown, but conventional. The driver has a downwardly open recess matching the hexagonal head of each screw 9 and includes an overload clutch, as is usual but not specifically illustrated. The chute 26 is vertically slidably guided in the casing 1 and is biased upward by a helical spring 70.

A rocker 71 mounted in the casing 1 for pivoting movement about the pivot pin 44 has an arm 72 from which a pin extends into a horizontally elongated slot 73 in the wall of the chute 26. The remainder 75 of the rocker 71 has a cam face 74. The upper and lower portions of the cam face 74 converge at an obtuse angle. In the position of the rocker 71 shown in FIG. 6, the lower portion of the cam face 74 projects into the path of the drive pin 20. While the pin causes the lever 41 to tilt from the position of FIG. 11 into that of FIG. 12, it also pivots the rocker 71 in the direction of the arrow 77, and thereby lowers the chute 26 as indicated by an arrow 78.

Two vertically elongated leaf springs 83 are fastened to diametrically opposite surface portions of the chute 26 and project downwardly beyond the chute. Each leaf spring carries a jaw 79, and the jaws jointly bound a downwardly tapering extension of the axial chute cavity terminating in an orifice barely big enough to pass the shank of a descending screw 9 when the chute 26 is in its raised position. The springs 83 bias the jaws to move apart, but a straight vertical face of a cam 80 on each jaw engaging a rotary pin 81 on the casing 1 maintains the position of the jaws 79 shown in FIG. 7. When the chute 26 is lowered, the pins 81 move from the vertical faces of the cams 80 to oblique cam faces 82 and permit the jaws 79 to spread as is shown in FIG. 8.

As is shown in FIG. 17, the magazine 10 is shaped to hold a stack of washers 8, the stack being reduced to two washers in the illustrated condition. A washer 8 may be withdrawn from the magazine 10 and placed below the chute 26 by a slide 84 horizontally guided by rails 92 on the casing bottom, as is better seen in FIG. 18. A square opening 93 in the slide is dimensioned to pass a washer 8 pressed downward by an inserted screw 9 with a force sufficient to push four spring-loaded, conical stops 94 into associated recesses of the slide. A boss 97 on the casing 1 prevents washers 8 from moving out of the stack in a direction away from the chute 26 and is received in a notch 96 in the top of the slide 84 in the slide position illustrated in FIG. 17. A rib 98 fixed in the casing 1 and elongated in the direction of slide movement matches another notch 95 in the top of the slide to prevent more than one washer 8 from being withdrawn at a time from the magazine 10.

The slide 84 is moved by the drive pin 21 on the rod 6 by means of a bell crank lever 85 pivotally attached to the casing 1 for movement about a horizontal axis, as indicated by an arcuate arrow 90 in FIG. 15. The slide 84 is biased outward of the magazine 10, not itself shown in FIGS. 15 and 16, by two helical tension springs 91 attached to the shorter upper arm 88 of the lever 85 and to the casing 1, but is prevented from pivoting in the direction of the arrow 90 as long as the rod 6 is in its top position in which the pin 21 engages a cam track 89 in the arm 88. The longer lever arm 86 is connected to the slide 84 by a coupling pin 87 sliding in a groove of the arm 86. When the pin 21 is released from the cam track 89, as is shown in FIG. 16, the springs 91 pull the slide 84 and a washer 8 held therein below the lower end of the chute 26. When the drive rod 6 is returned upward to its starting position, the pin 21 again enters the cam track 89 and shifts the slide 84 into the magazine 10. Even when the slide is aligned with the chute 26, enough of it remains in the magazine to prevent downward movement of the stack of washers 8.

The several mechanisms described above operate as follows, starting from the position of FIG. 1:

When the drill 4 is pressed downward, the drive pin 21 on the control rod 6 moves outward of the cam track 89, and a washer 8 is shifted by the slide 84 to a position below the chute 26 in which a central bore in the washer is aligned with the rotating spindle 67. The pin 21 then leaves the cam track 89. At this stage, the drive pin 19 moving in the groove 54 reaches the baffle 58 and causes the bar 53 to turn and the feeder 25 to insert a screw through the channel 52 and the opening 69 into the chute 26 where its head is engaged by the descending, rotating driver 68.

After the drive pin 19 returns to the groove 54 and the feeder 25 is withdrawn to its starting position, the drive pin 20 on the rod 7 reaches the lower portion of the groove 43 in the operating lever 41 so that the pusher 23 advances the row of screws 9 on their non-illustrated carrier and positions the leading screw 9 for engagement by the pawl 24 under the force of its non-illustrated spring. Approximately simultaneously, the lever 71 is pivoted by the drive pin 20 to lower the chute 26 and spread the jaws 79. In the meantime, the screw engaged by the driver 68 was lowered through the restricted opening of the retracted jaws 79 and its point inserted into the material to be fastened through the bore in the aligned washer 8, and the head of the screw passes with the driver between the opened jaws 79 to push the washer out of the slide 84 and to complete the fastening operation.

When the drill 4 thereafter is raised by the operator, the chute 26 is returned to its starting position by the lever 71, and the pusher 23 moves backward past the next screw on the carrier, being deflected laterally by the screw. The drive pin 19 on the rod 7 moves straight upward in the groove 54. The drive pin 21 enters the cam track 89 and shifts the now empty slide 84 into the magazine 10 to receive the next washer 8 by gravity. The apparatus is ready for the next cycle of operation.

Figure 20:
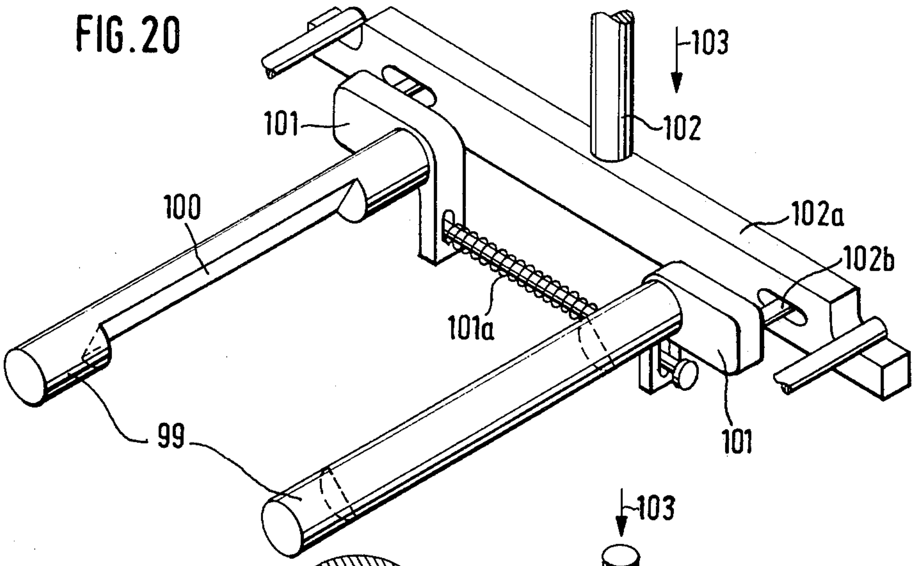
FIG. 20 illustrates elements of the device of FIG. 19 in a corresponding view.
Figure 19:
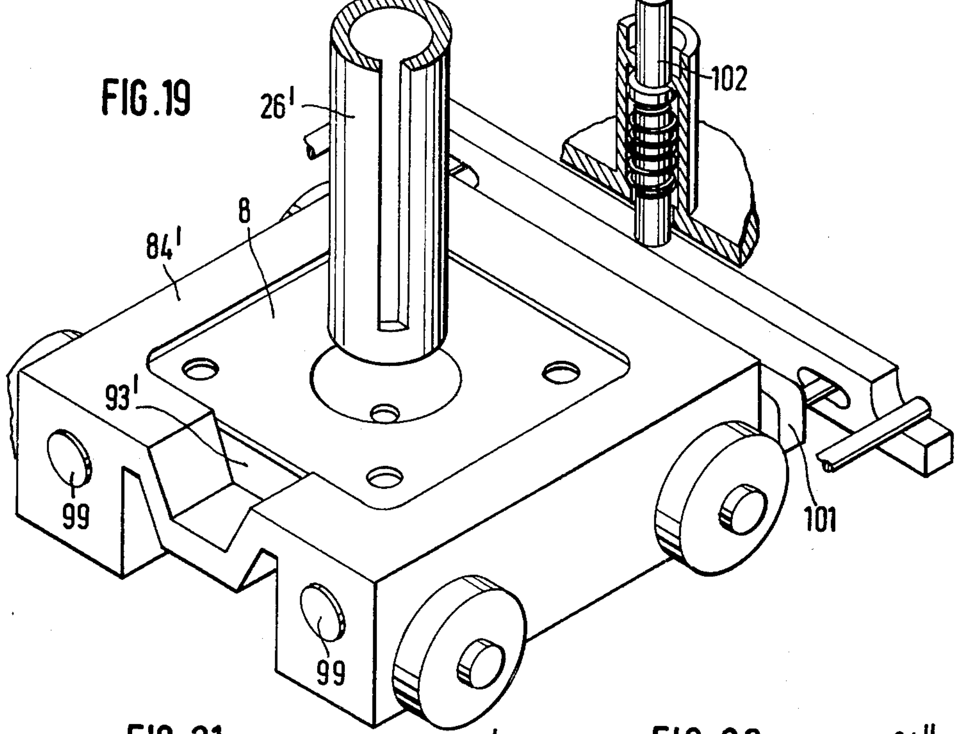
FIG. 19 shows a washer slide and associated elements in a modified apparatus of the invention.
Figure 21:
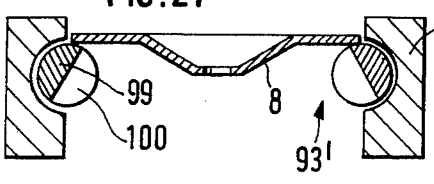
FIG. 21 shows the slide of FIG. 20 in fragmentary, front-elevational section.

A modified, wheeled slide 84' and associated elements are shown in FIGS. 19–21. The slide cooperates with a chute 26' which is longitudinally fixed in the casing in a manner not specifically illustrated. Its lower end is closely adjacent the path of slide movement at all times. The central bore of a washer 8 aligned with the chute 26' provides the same guidance for the shank of a descending screw as do the jaws 79 in the first-described embodiment of the invention. Two rods 99 are rotatably mounted in the two sides of the slide 84' and have respective flats 100 ground into their longitudinally central, originally cylindrical portions. They may be turned each between a non-illustrated position in which they are flush with respective side walls of the opening 93' of the slide and the position illustrated in FIGS. 20 and 21 in which they project sufficiently far into the opening 93' to prevent a washer 8 from passing downward through the opening.

Cranks 101 on respective portions of the rods 99 projecting from the slide 84' carry crank pins 102b received in slots of a transverse bar 102a when the carriage is aligned with the chute 26'. A helical spring normally biases an operating rod 102 on the bar 102a into a position in which the slots in the bar 102a are aligned with the crank pins 102b in the direction of slide movement. The pins are biased by a spring 101a into a position of alignment in which the rods 99 block passage of a washer 8 through the opening 93'. When the head of the inserted screw closely approaches the washer 8 in the slide 84', and the point of the screw has started engaging a substrate, a driving linkage, not illustrated, but connected to one of the control rods 6, 7 in a manner obvious from the description of FIGS. 4 to 18, pushes the operating rod 102 downward, as indicated by an arrow 103, so that the washer 8 can fall out of the slide 84'.

Figure 22:
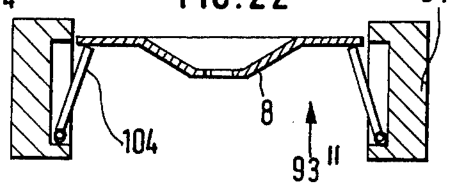
FIG. 22 is a view corresponding to that of FIG. 21 of a further modified washer slide.

In the further modified slide 84" illustrated in FIG. 22 and not significantly different from the slide 84' except as specifically shown, the sides of the slide bounding the opening 93" are recessed, and flaps 104 are mounted on respective pivot shafts in the recesses for movement between their illustrated positions in which they slope obliquely upward into the opening 93" and retracted positions in the respective recesses in which they permit a washer 8 to fall through the slide 84". The pivot shafts are turned between the two positions of the flaps in the same manner as the rods 99 in FIGS. 19–21. The projecting flaps 104 block passage through the opening 93".

Figure 23:
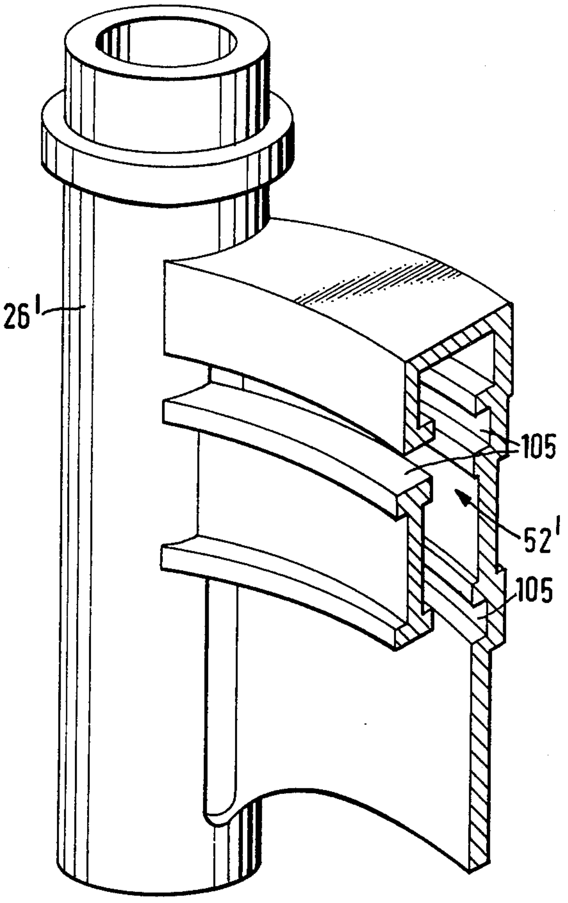
FIG. 23 is a perspective, fragmentary view of a screw feeding mechanism in a modification of the apparatus of FIG. 1.

When apparatus of the invention is equipped with a stationary chute 26', as described with reference to FIGS. 19–21, also 22, there is no need for a guide channel 52 directly mounted on the casing 1, and a circularly arcuate guide channel 52' may be fixedly attached to the chute, as is shown in FIG. 23. Guide grooves 105 in the channel receive the arms 49, 50 of the feeder 25, not itself shown in FIG. 23, as has been described with reference to FIG. 13, but is more clearly seen in FIG. 23.

Figure 24:
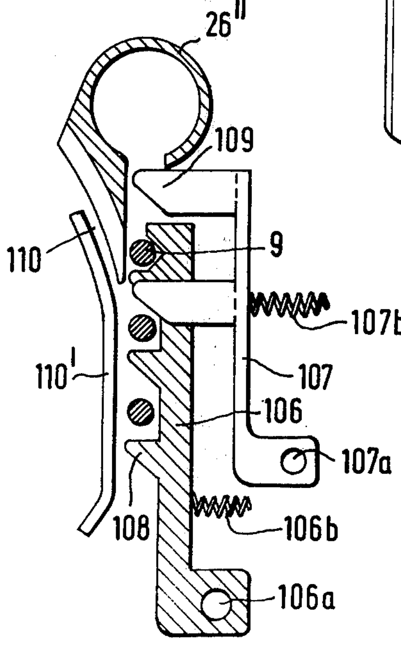
FIG. 24 shows another screw feeding mechanism in sectional plan view.

The arcuate, horizontal feeding path for screws entering a chute and the corresponding movement of a feeder 25 and the need for an associated pawl 24 and pusher 23 may be avoided in an arrangement illustrated in FIG. 24. A feed channel is defined between a fixed wall 110 of the casing, not otherwise shown, and a normally parallel bar 106 which carries teeth 108 projecting into the feed channel. The bar 106 is pivotally mounted on a shaft 106a and biased inward of the channel by a helical compression spring 106b. A second, similar bar 107 carrying teeth 109 is mounted on a shaft 107a and biased inward of the feed channel by a spring 107b. The teeth 108 and corresponding teeth 109 on the bar 107 have flanks directed toward the chute 26" and perpendicular to the direction of screw movement into the fixed chute 26" and flanks directed away from the chute 26" and obliquely inclined relative to the first-described flanks. The shafts 106a, 107a may be reciprocated in a straight line toward and away from the chute 26" in such a manner that one moves forward while the other moves backward. During the forward movement, they advance screws on a non-illustrated carrier tape toward the chute 26". During the backward movement, they are pivoted out of the path of the screws by the screws engaging the oblique faces of the teeth 108, 109. The wall 110 bounds a narrow channel 110' obliquely diverging from the path of the screws adjacent the chute 26". The carrier tape, no longer needed at this stage, is discharged through the channel 110', and similar provisions are made, though not shown, in other embodiments of the invention.

Figure 25:
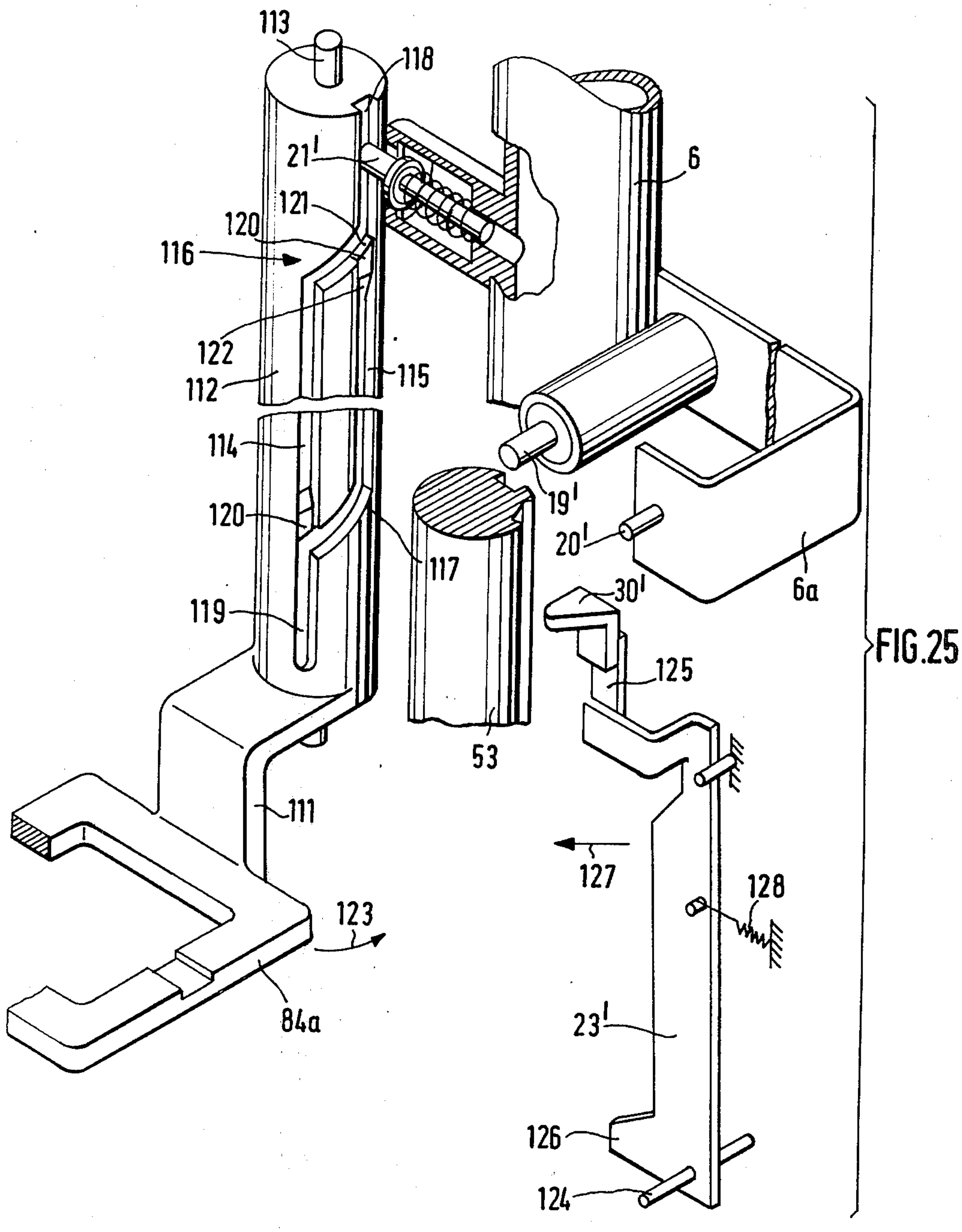
FIG. 25 is a fragmentary, perspective view of a modified drive and control arrangement for a screw-and-washer mounting apparatus of the invention.

Screw driving apparatus of the invention employing only one control rod 6 carrying three partly spring-loaded drive pins 19', 20', 21' is shown in FIG. 25. A bar 112 of overall cylindrical configuration is mounted on stub shafts 113 for movement about an upright axis. A bracket 111 fixedly connects the lower end of the bar 112 with a slide 84a otherwise closely similar to the slides described above. The axially central portion of the bar 112 is provided with two circumferentially spaced grooves 114, 115. The upper end of the groove 114 is connected by an oblique groove section 116 to the upper end of the groove 115 provided with a fixed baffle 120, and a groove 118 axially aligned with the groove 115 extends thence to the upper end of the bar 112. Similarly, the lower end of the groove 115 is connected by an oblique groove section 117 to the lower end of the groove 114 in which a fixed baffle 120 is mounted and from which a straight axial groove 119 descends practically to the lower end of the bar 112. The two baffles are substantially identical with each other and similar to the device illustrated in FIG. 10 in that each has a cam face 121 which blocks movement of a pin 21' inward of the associated groove 114 or 115, and another cam face 122 permitting pin movement out of the groove when the pin moves toward the bar 6 against the restraint of its biasing pin.

The pin 21' thus causes angular movement of the bar 112 on the shafts 113 as the pin moves upward and downward in the grooves of the bar, as described with reference to FIG. 9. When the pin 21' descends from the position illustrated in FIG. 25, the slide 84a is swung in an arc into alignment with the non-illustrated chute of the apparatus to feed a washer into the path of a rotating screw in the direction of arrow 123. The slide 84a remains in position under the chute until the pin 21' approaches its terminal position during its return movement. Another drive pin 19', attached to the control rod 6 by a bracket 6a and spring-loaded in the manner of the pin 21', engages grooves in a bar 53 substantially identical with the equally numbered device described with reference to FIG. 9 and carrying a feeder, not itself shown in FIG. 25.

The third drive pin 20', also mounted on the bracket 6a, operates a pusher mechanism, functionally equivalent to the aforedescribed pusher 23. It includes a vertically elongated sheet metal arm 23' whose lower end is pivotally mounted in the non-illustrated casing by means of a pin 124 and carries a cam 126 in the vertical path of the pin 20'. A helical tension spring 128 normally holds the arm 23' in the illustrated position. The arm is pivoted counterclockwise, as indicated by an arrow 127, when the pin 20' strikes the cam 126. A leaf spring 125 attached to the top end of the arm 23' carries a pusher element 30' having the approximate shape of a right isoceles triangle. When the arm 23' swings in the direction of the arrow 127, the pusher element advances a screw carrier by one screw spacing. When the arm 23' is returned to the illustrated position, the element 30' is deflected by the now first screw as the leaf spring 125 yields to the force transmitted by an edge of the element 30' obliquely inclined relative to the direction of screw movement.

Figure 26:
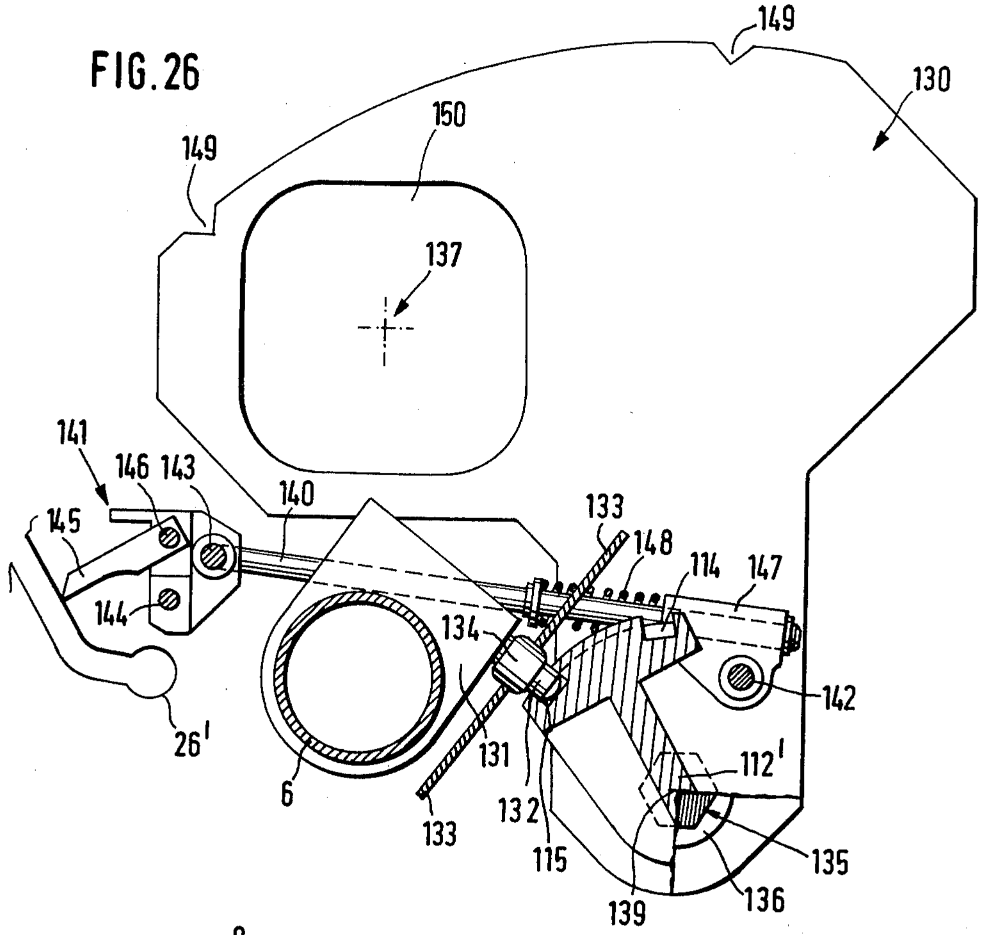
FIG. 26 is a sectional, fragmentary top plan view of yet another drive and control mechanism for apparatus of the invention.

In the further modified screw driving apparatus of the invention shown in FIGS. 26 to 28, a tubular control rod 6 is mounted on an electric drill in the manner described with reference to FIG. 1. A flange 131 on the rod 6 carries a drive pin 132 spring-loaded toward the illustrated position of engagement with a groove 115 in a bar 112' of T-shaped cross section mounted on stub shafts for pivotal movement about a vertical axis 139 and having another groove 114 and additional grooves as shown on the bar 112 in FIG. 25 so that the bar 112' swings back and forth during vertical movement of the pin 132 with the control rod 6. A needle bearing 134 coaxially mounted on the pin 132 is guided between the edges of sheet metal panels 133 fixedly mounted in the casing to absorb the torque exerted by the bar 112' on the pin 132.

The lower, hexagonal end 135 of the bar 112' engages a conforming socket 136 on a horizontal plate 130. The plate is provided with a square opening 150 dimensioned to receive washers 8. A spring-loaded stop, not shown, engages one of two marginal notches in the plate 130 in the angularly terminal positions of the bar 112' respectively. In the illustrated position, the opening 150 is aligned with a washer magazine, not shown, in a manner evident from FIG. 17, and in its other end position, the center 137 of the opening 150 is vertically aligned with a chute 26' of the type seen in FIG. 19. The plate 130 is provided with non-illustrated stops analogous to the afore-described stops 94 and other devices which control removal of only one washer from the non-illustrated magazine by the plate 130 during each reciprocating arcuate movement of the bar 112' and permit release of the washer from the plate 130 under the pressure of a screw descending in the chute 26' as described above.

A tubular bracket 147 is mounted on the plate 130 spacedly adjacent the axis 139 by means of a vertical pivot pin 142. One end of a cylindrical connecting rod 140 is slidably received in the bracket 147 and biased by a helical compression spring 148 outward of the sleeve into the illustrated position defined by a stop. The other end of the rod 140 is hingedly linked by a pin 143 to a feeder 141 pivotally mounted on the casing by another pin 144.

Figure 27:
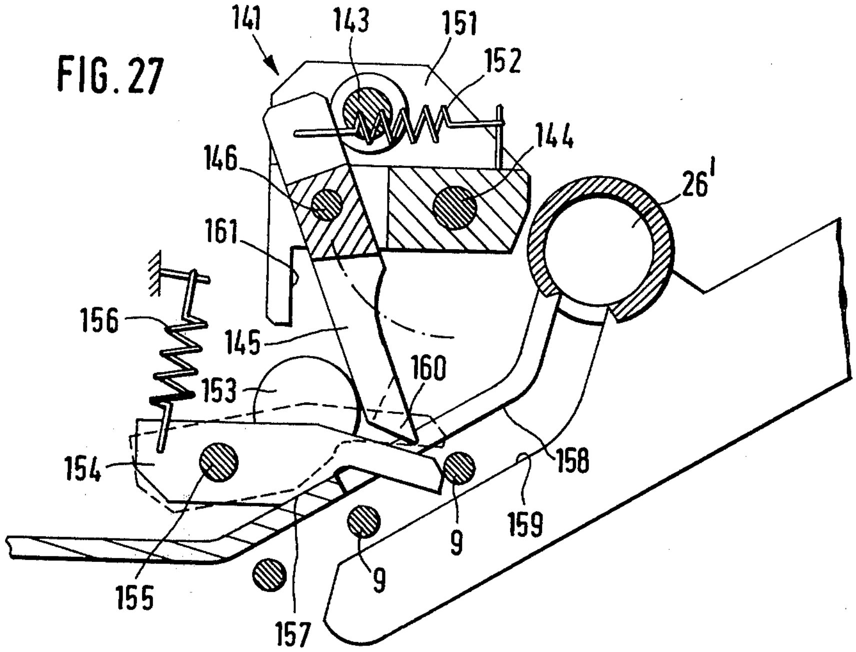
FIGS. 27 and 28 show elements of the mechanism of FIG. 26 on a larger scale and in two different operating positions.
Figure 28:
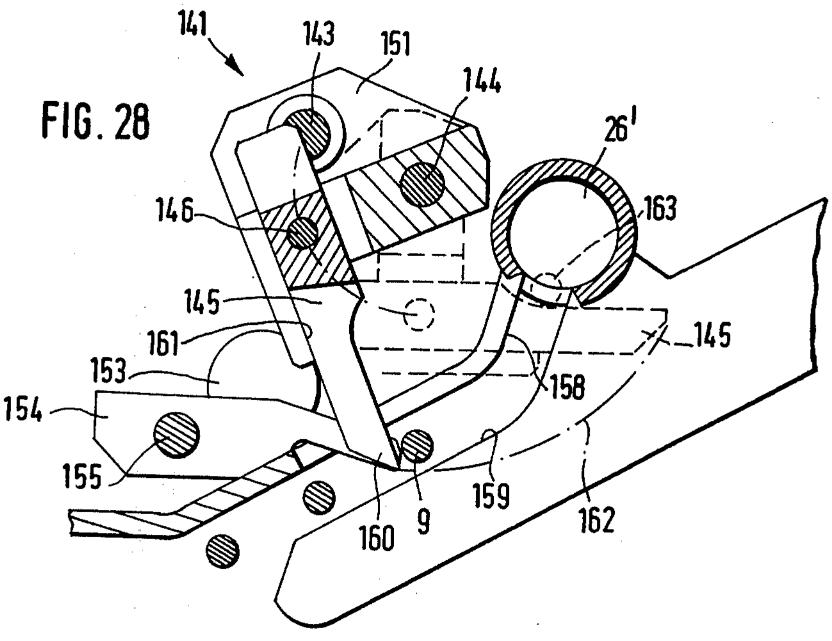

As is better seen in FIGS. 27 and 28, the feeder 141 includes a carrier plate 151 which is pivoted on the pin 144 by longitudinal movement of the connecting rod 140. A feeder arm 145 is mounted on the carrier plate 151 by means of a pivot pin 146 and biased clockwise toward abutting engagement with an abutment 153 on the casing by a helical tension spring 152 shown in FIG. 27 only. When the plate 151 is turned counterclockwise from the position of FIG. 27 by the rod 140, a stop 161 on the carrier plate 151 engages the arm 145 and moves it in an arc 162 into the position of abutting engagement with the chute 26' shown in broken lines in FIG. 28. The free end 160 of the arm 145 moves in slots of the walls 158, 159 of a guide channel similar to the guide channel 52' (FIG. 22). After the arm 145 is stopped by the chute 26', the bracket 147 continues moving a short distance counterclockwise, as viewed in FIG. 26, thereby stressing the spring 148. A pawl 154 mounted on a fixed pivot pin 155 is biased inward of the guide channel 158, 159 by a helical tension spring 156 (FIG. 27).

In the condition of the apparatus illustrated in FIG. 27, screws 9 mounted on a non-illustrated carrier are prevented from moving out of the guide channel 158, 159 by the pawl 154 backing the first screw 9. While a washer 8 is fed into alignment with the chute 26', the end 160 of the feeder arm 145 engages the first screw 9 and shifts it toward the position 163 shown in broken lines, the screw being released from the carrier during this movement, and the carrier being discharged from the guide channel as is shown in FIG. 24. The screw drops from the position 163 to resilient centering jaws in chute 26', functionally analogous to the jaws 79 (FIG. 7) which yield after the screw is engaged by the driver, not shown in FIGS. 26–28.

Because of the shapes of the pawl 154 and the feeder arm 145 which are similar to the corresponding elements described with reference to FIGS. 13 and 14, the pawl does not interfere with movement of the screws toward the chute 26', nor do the screws interfere with return movement of the feeder arm 145 to the position of FIG. 27.

Figure 29:
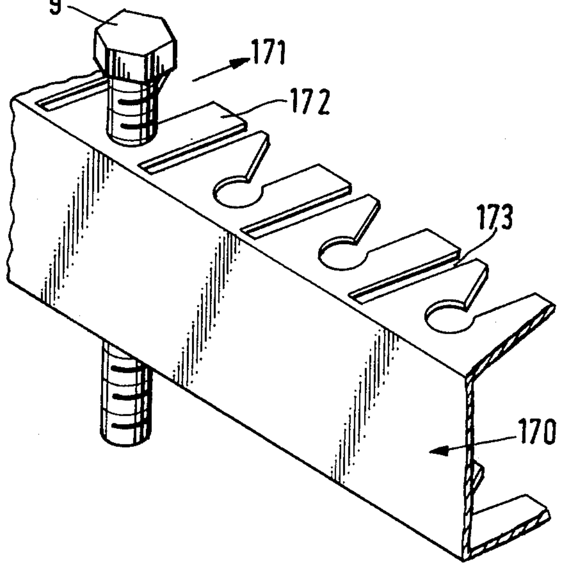
FIG. 29 shows a screw carrier for use in apparatus of the invention.

An alternative carrier 170 for screws 9 being fed to a chute in the screw driving devices of the invention is illustrated in FIG. 29. It is a channel of flexible material such as thin cardboard whose two flange portions are divided by slots 173 into lugs 172 formed with laterally open, approximately keyhole-shaped recesses receiving respective screws 9 and readily deformed to release the screws transversely as indicated by an arrow 171 when the empty end of the carrier is deflected in the opposite direction while the screw is being moved by a feeder.

Only one feeder arm 145 was described with reference to FIGS. 26–28, but a fixedly connected second arm will be advantageous for screws longer than ¾ inch and may be provided in a manner obvious from the showing of FIG. 9. While a pawl is normally a desirable element of a feeding mechanism, a pusher, as shown at 23 in FIG. 4, may be omitted when suitably arranging other elements of the mechanism as is shown, for example, in FIG. 24, and the motion transmitting train from a power source to the feeding mechanism of the screw driving apparatus may be simplified thereby.

The illustrated and described embodiments of the invention have been described or implied as being portable and to be powered by an electric drill so as to be readily movable along roofing panels and other bulky material. The basic features of this invention, however, are equally useful in stationary screw driving apparatus which applies washers together with the screws to workpieces which are moved relative to the apparatus. Power sources other than the electric motor of a hand-held drill will readily suggest themselves to those skilled in the art.

It should be understood, therefore, that the foregoing disclosure relates only to preferred embodiments, and that it is intended to cover all changes and modifications of the examples herein chosen for the purpose of the disclosure which do not constitute departures from the spirit and scope of the invention set forth in the appended claims.

What is claimed is:

1. Screw driving apparatus comprising:

(a) a support having a first end and a second end with said support being elongated in the first end-second end direction;

(b) a chute having a first end and a second end with the first and second ends thereof being oriented in the same manner and direction as the first and second ends of said support, an axis extending in the first end-second end direction thereof and formed with an opening affording access to the interior of said chute from the exterior thereof intermediate said first and second ends, said chute being movably displaceable on said support for movement in the direction between the first and second ends thereof;

(c) feeding means mounted on said support for feeding screws one at a time through said opening into said chute;

(d) a driver extending into said chute at the first end thereof for movement toward the second end thereof and shaped for driving engagement with a screw introduced into said chute by said feeding means;

(e) drive means mounted on said support for movement in the first end-second end direction of said support for axially moving said driver in said chute and for rotating said driver about an axis at least generally parallel to said axis of said chute for thereby engaging the driver with said screw and rotating the driver together with the screw while axially moving the screw with the rotating driver toward the second end of said chute;

(f) a magazine located laterally of said chute and adapted to hold a plurality of apertured washers and said magazine being mounted on said support;

(g) slide means for moving said washers one at a time transversely to said axis of said chute from said magazine to a position at the second end of said chute with the aperture in the moved washer aligned with the screw to be introduced into said chute; and (h) motion transmitting means at least partly mounted on said support and operatively connected to said feeding means, said drive means, and said slide means for transmitting motion from said drive means to said feeding means, and said said slide means in timed sequence.

2. Apparatus as set forth in claim 1, wherein said slide means including a slide member moving between said magazine and said support and transporting individual washers in response to the movement transmitted to said slide means by said motion transmitting means.

3. Apparatus as set forth in claim 2, wherein said motion transmitting means include a carrier, said driver being mounted on said carrier for joint movement therewith in the direction of said axis of said chute, a control member axially fixed on said carrier, and connecting means operatively connecting said control member to at least one of said feeding means and slide means.

4. Apparatus as set forth in claim 3, wherein said connecting means include a body mounted on said support for movement about an axis of rotation approximately parallel to the axis of said chute, said body having an arcuate face about said axis of rotation, said face being formed with a groove obliquely inclined relative to said axis, said control member carrying a projection engaging said groove, whereby said body is moved angularly about said axis of rotation in response to said joint movement.

5. Apparatus as set forth in claim 4, wherein said feeding means include a feeder member secured to said body for angular movement toward and away from said opening of said chute.

6. Apparatus as set forth in claim 4, wherein said slide member is secured to said body for movement therewith between said magazine and said casing.

7. Apparatus as set forth in claim 3, wherein said connecting means include a lever member mounted on said support for tilting movement about an axis transverse to said axis of the chute, said lever member being formed with a recess, said control member carrying a projection engaging said recess and thereby tilting said lever member about said transverse axis in response to said joint movement.

8. Apparatus as set forth in claim 7, wherein said connecting means further include coupling means coupling said lever member to said slide member for moving said slide member between said magazine and said support in response to said tilting of the lever member.

9. Apparatus as set forth in claim 7, wherein said feeding means include a feeder member movable on said support, and said connecting means further include coupling means coupling said lever member to said feeder member for moving said feeder member in response to said tilting of the lever member.

10. Apparatus as set forth in claim 2, wherein said feeding means include a feeder member mounted on said support for movement toward and away from said opening of said chute, and said motion transmitting means include connecting means connecting said slide member to said feeder member for moving the feeder member toward and away from said opening in response to movement of said slide member.

11. Apparatus as set forth in claim 2, wherein said chute is mounted on said support for limited axial movement, said motion transmitting means including means operatively connecting said source to said chute for axially moving the chute in timed sequence with the transmission of motive power to said feeding means, said drive means, and said slide means.

12. Apparatus as set forth in claim 1, wherein said chute having a pair of jaws at the second end thereof displaceable from a first position providing a closure for the second end of said chute to a second position affording movement of a screw out of the second end of said chute.

* * * * *